(12) United States Patent
Klein et al.

(10) Patent No.: US 7,756,846 B2
(45) Date of Patent: Jul. 13, 2010

(54) METHODS AND SYSTEMS FOR PROPAGATING LOCKS THROUGH NESTED LOGICAL UNITS OF WORK

(75) Inventors: Udo Klein, Maximilliansau (DE); René Dehn, Sinsheim (DE)

(73) Assignee: SAP Aktiengesellschaft, Walldorf (DE)

( * ) Notice: Subject to any disclaimer, the term of this patent is extended or adjusted under 35 U.S.C. 154(b) by 263 days.

(21) Appl. No.: 11/171,182

(22) Filed: Jul. 1, 2005

(65) Prior Publication Data
US 2007/0005599 A1 Jan. 4, 2007

(51) Int. Cl.
G06F 7/00 (2006.01)
G06F 17/00 (2006.01)
(52) U.S. Cl. ................................ 707/704; 707/999.008
(58) Field of Classification Search ........................ 707/8
See application file for complete search history.

(56) References Cited

U.S. PATENT DOCUMENTS

| 5,319,780 | A | * | 6/1994 | Catino et al. ..................... 707/8 |
| 5,390,328 | A | * | 2/1995 | Frey et al. ..................... 719/315 |
| 5,426,747 | A | * | 6/1995 | Weinreb et al. ............. 711/203 |
| 5,742,813 | A | * | 4/1998 | Kavanagh et al. ............... 707/8 |
| 5,805,900 | A | * | 9/1998 | Fagen et al. .................. 710/220 |
| 6,006,332 | A |   | 12/1999 | Rabne et al. |
| 6,338,146 | B1 |   | 1/2002 | Johnson et al. |
| 6,701,436 | B1 | * | 3/2004 | Hirai ........................... 713/176 |
| 7,020,695 | B1 | * | 3/2006 | Kundu et al. ................. 709/223 |
| 2003/0105756 | A1 | * | 6/2003 | Daynes ........................... 707/8 |
| 2004/0205545 | A1 | * | 10/2004 | Bargeron et al. ............ 715/512 |
| 2004/0267807 | A1 |   | 12/2004 | Barabas et al. |
| 2005/0024200 | A1 |   | 2/2005 | Lambright et al. |
| 2005/0240585 | A1 | * | 10/2005 | Makhervaks et al. ........... 707/8 |
| 2007/0005640 | A1 |   | 1/2007 | Klein et al. |
| 2009/0077083 | A1 | * | 3/2009 | Magruder et al. .............. 707/8 |

OTHER PUBLICATIONS

Wolman, B. L., An analysis of server-based locking, published by ACM SIGARCH Computer Architecture News in Sep. 1989, vol. 17, Issue 5.*
Mohan, C., AREIS: a transaction recovery method supporting fine-granularity locking and partial rollbacks using write-ahead logging, published by ACM Transactions on Database Systems in Mar. 1992, vol. 17, Issue 1.*

(Continued)

Primary Examiner—Pierre M Vital
Assistant Examiner—Rachel J Lee
(74) Attorney, Agent, or Firm—Finnegan, Henderson, Farabow, Garrett & Dunner, LLP (57) ABSTRACT

Systems and methods are disclosed for managing a lock on an object dependent upon a nested LUW. The disclosed systems and methods may include registering a lock manager with an LUW manager responsible for managing a nested LUW on a buffer. The nested LUW may comprise an inner LUW and an outer LUW. The systems and method may further include locking an object affected by the inner LUW of the nested LUW. The LUW manager may transmit to the lock manager any events pertaining to the inner LUW. The lock manager may be operative to determine, based on the events pertaining to the LUW received from the LUW manager, whether the lock should be retained or released such that the status of the lock is consistent with the state of the nested LUW.

14 Claims, 6 Drawing Sheets

OTHER PUBLICATIONS

Daynes et al., "On the Cost of Lock Inheritance in Lock Managers Supporting Nested Transactions," Proceedings of the 10th Journees de Bases de Donnees Avancees, 1994.*

Busetta et al., "An Architecture for Mobile BDI Agents," ACM, 1998.*

Saheb et al., "Open Nested Transactions: A Support for Increasing Performance and Multi-tier Applications," Springer-Verlag Berlin Heidelberg, 2000.*

* cited by examiner

METHODS AND SYSTEMS FOR PROPAGATING LOCKS THROUGH NESTED LOGICAL UNITS OF WORK

BACKGROUND OF THE INVENTION

I. Field of the Invention

The present invention generally relates to methods and systems for locking objects being maintained in an object-oriented system. More particularly, the present invention relates to providing a database lock for an object maintained in transient memory and managing the lock based on the status of a nested logical unit of work affecting the object.

II. Background Information

Applications maintaining an internal state in transient memory are known in the art. Operations, which may have the effect of changing an application's state, may be performed in transient memory, such as in an object instance opened on a buffer. Frequently, to accomplish a desired task, it is necessary to perform a group of potentially state-changing operations. The nature of the task may be such that it is desirable that if one or more of the operations fails, none of the state changes caused by the group of operations take effect.

In order to address this concern, logical units of work (LUW) are provided in the art. An LUW is an inseparable set of operations that must be executed in their entirety or not at all. Although LUWs are commonly known in the art as a set of database operations, an LUW may also be opened in a buffer to group together a set of buffered operations affecting application state.

For example, an application operative to effect a money transfer from a checking account to a savings account may execute a number of operations to fully accomplish a transfer, including: (1) removing funds from the checking account; (2) adding funds to the savings account; and (3) generating a record of the transaction. While each of these steps may be carried out separately, it is desirable to tie them together such that if one fails, none of the changes are implemented. In this manner, it is possible to avoid a scenario in which the system successfully removes funds from the checking account (operation 1) but for some reason, such as loss of power to the system, fails to effect the addition of funds to the savings account (operation 2), leaving the account holder with a net loss of funds.

LUWs generally conclude with either a "rollback" or "commit" statement. If the LUW is rolled back, none of the operations comprising the LUW take effect and the application is returned to its initial state—the state existing prior to execution of any of the operations comprising the LUW. By committing an LUW, the changes made to the state of the application by the operations contained therein are made accepted, and the application state existing prior to performing the LUW operations is discarded, meaning the application state may no longer be rolled back.

In certain instances, one or more operations of an LUW may comprise a set of sub-operations that desirably execute or fail as a whole. In such cases, it may be desirable to treat the sub-operations as an inner LUW within the outer, original LUW. A group of LUWs comprising an outer LUW and at least one inner LUW may be termed a "nested" LUW. Similar to the operation of a single LUW, if a single sub-operation of an inner LUW fails, the inner LUW will roll back to the application state existing prior to execution of the sub-operations comprising the inner LUW. However, rolling the inner LUW back will not roll the application back to the state existing prior to execution of the outer LUW.

Often, state-holding entities, such as buffered objects or locking mechanisms, are interested in the status of LUW operations and/or the application state resulting from LUW operations. However, typical LUW managers are not operative to ensure that interested entities are made aware of events relating to LUW operations. This inability to facilitate awareness of LUW events may have negative consequences. For example, an interested object not aware of state changes caused by LUW operations may present inconsistent data. Similarly, a locking mechanism placing a lock on an object affected by LUW operations may inadvertently leave the lock in place after the LUW is committed, preventing access to the object after the need for the lock has dissipated.

In object-oriented systems, it is common for more than one application or user to have concurrent access to an object. Naturally, in concurrent systems, it is desirable to ensure that a consistent view of the object is provided to every requesting application or user. In an effort to ensure consistency of the object view provided to requesting applications, it is known in the art to issue locks on objects that are checked out to a requesting application. Two common types of locks are (i) exclusive locks; and (ii) shared locks. An exclusive lock allows the requesting application to change the state of the object and prevents other application from changing the object state. Generally, only one exclusive lock at a time may be placed on a particular object. Conversely, multiple shared locks may be placed on an object. A shared lock allows the requesting application to read an object, but does not allow the requesting application or any other application to change the state of the object.

While lock mechanisms are operative to place a database lock on an object being maintained by an application in transient memory, such mechanisms are typically not suited to ensure consistency in systems performing nested LUWs in transient memory rather than on the database. The inability of a locking mechanism to properly manage locks in nested LUWs may result in a lock remaining on an object after that object has been released by the application that requested the lock. As a result, a later-requesting application may be incorrectly prohibited from changing the state of the object.

SUMMARY OF THE INVENTION

Consistent with embodiments of the present invention, systems and methods are disclosed for managing locks of objects dependent upon nested logical units of work (LUW).

In accordance with one embodiment, a method for managing a lock on an object dependent upon a nested LUW may comprise registering a lock manager with an LUW manager responsible for managing a nested LUW on a buffer. The nested LUW may comprise an inner LUW and an outer LUW. The method may further comprise locking an object affected by the inner LUW of the nested LUW. The method may comprise transmitting to the lock manager an event pertaining to the inner LUW. The method may also include determining, based on the event pertaining to the LUW, whether the lock should be retained or released such that the status of the lock is consistent with the state of the nested LUW.

According to another embodiment, a system for managing a lock on an object dependent upon a nested LUW may include an LUW manager operative to effect a request from an application to open a nested LUW on a buffer. The nested LUW may comprise an inner LUW and an outer LUW. The system may also comprise a lock manager operative to register with the LUW manager, wherein the lock manager is operative to effect a request from the application to lock an object affected by the inner LUW. The LUW manager may be operative to transmit to the lock manager an event pertaining to the inner LUW. The lock manager may be operative to determine, based on the event received from the LUW manager, whether the lock on the object should be retained or released such that the state of the lock is consistent with the state of the nested LUW.

In accordance with yet another embodiment, a computer-readable medium which stores a set of instructions which, when executed, performs a method for managing a lock on an object dependent upon a nested LUW is disclosed. The computer-readable medium may include, for example, RAM, ROM, a hard disk, floppy disk, CD-ROM, flash memory, or one or more other known memory storage devices. The set of instructions may comprise prompting an LUW manager to open a nested LUW on a buffer. The nested LUW may comprise an inner LUW and an outer LUW. The set of instructions may also comprise prompting a lock manager to register with the LUW manager. The set of instructions may include prompting the lock manager to place a lock on the inner LUW. The set of instructions may also include prompting the LUW manager to transmit an event pertaining to the nested LUW to the lock manager. The set of instructions may also comprise determining, based on the event pertaining to the nested LUW transmitted to the lock manager, whether to retain or release the lock such that the status of the lock is consistent with the status of the nested LUW.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible without departing from the spirit and scope of the invention. For example, substitutions, additions and/or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

As embodied herein, methods and systems are provided for managing nested logical units of work (LUW) performed in transient memory and of ensuring that state-holding entities interested in the status of LUW operations and/or application state changes occurring as a result of operations are aware of LUW events. Consistent with the principles of the present invention, an application may prompt an LUW manager to open an LUW in transient memory. The LUW manager may further be capable of opening and managing nested LUWs. The LUW manager may also be operative to ensure that state-holding entities interested in LUW operations and/or state changes occurring as a result of LUW operations are aware of LUW events.

As described above, an application may open or create an LUW by calling the LUW manager. The LUW manager may be operative to open an LUW object in transient memory, such as in a buffer, in response to the application's request. Once the LUW manager has opened the LUW in the buffer, the application may perform operations inside the LUW. The LUW manager may also implement a request from the application to open a nested LUW and to keep track of the current level of nested LUW opened by the application.

The LUW manager may also be capable of receiving and implementing, either directly or indirectly, commands from the application to (i) rollback the LUW; (ii) commit, or close, the LUW; or (iii) flush the current application state from transient memory to a database. In response to a rollback command, the LUW manager may cause the application to be restored to the state existing prior to performance of the LUW operations. In response to a commit command, the LUW manager may cause the LUW to be closed, effectively accepting the state changes caused by the LUW operations, and to cause the application state existing prior to performance of the LUW operations to be discarded from transient memory. In response to a flush command, the LUW manager may cause the currently buffered state to be made persistent on the database.

In one aspect consistent with the principles of the present invention, an LUW handler may be operative to receive and carry out commands from the application, via the LUW manager, to rollback, commit and flush commands. In one version, the LUW handler may comprise an application buffer operative to store the application state. The application may create the application buffer when it desires to perform state-changing operations. The application buffer may be operative to implement an LUW handling interface that is operative to carry out application commands, such as requests to rollback the application state, commit the results of LUW operations, or flush the buffer state to a database. As described above, the application may issue rollback, commit and flush commands to the LUW manager. Thus, in order to receive commands regarding the LUW, the application buffer, or LUW handler, may register with the LUW manager to receive notice of LUW events. The application buffer may store the application state in various ways known in the art. For example, the application buffer may store the application state in (i) an internal table; (ii) an extensible mark-up language string; (iii) memento objects; or (iv) binary large objects.

Once the LUW handler is registered with the LUW manager, the LUW handler may be operative to store the current application state in memory in response to notice from the LUW manager that a new LUW has been opened at the application's request. If, after performing state-changing operations in an LUW, the application desires to roll back the operations to the previous application state, the LUW handler may be operative to retrieve and restore the state existing prior to performance of the LUW operations. If the application issues a command to close the LUW, the LUW handler may be operative to discard the application state existing prior to performance of the LUW operations it stored in transient memory.

Figure 1:
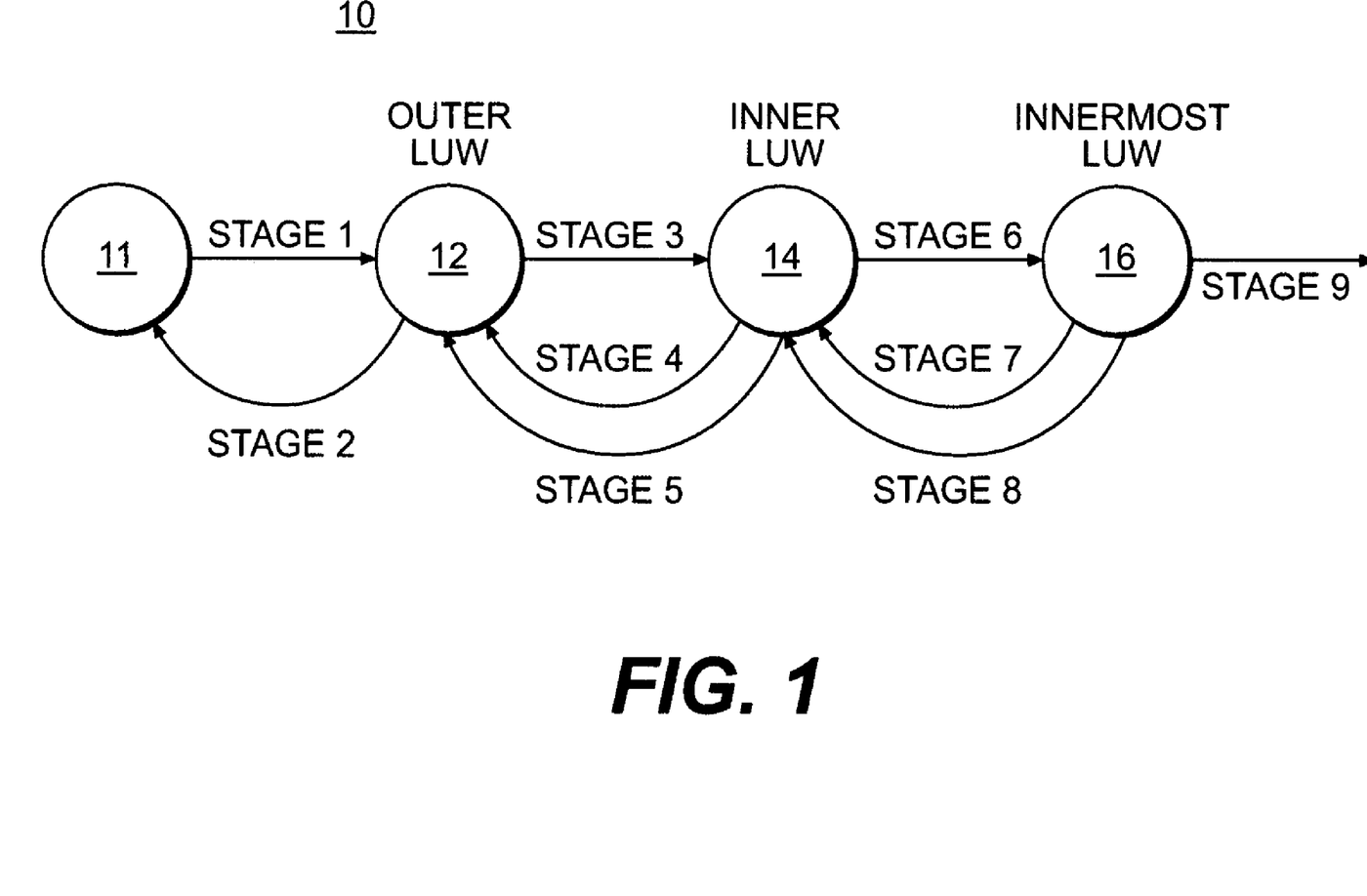
FIG. 1 is a state diagram representing the operation of a nested LUW consistent with the principles of the present invention.
Figure 2:
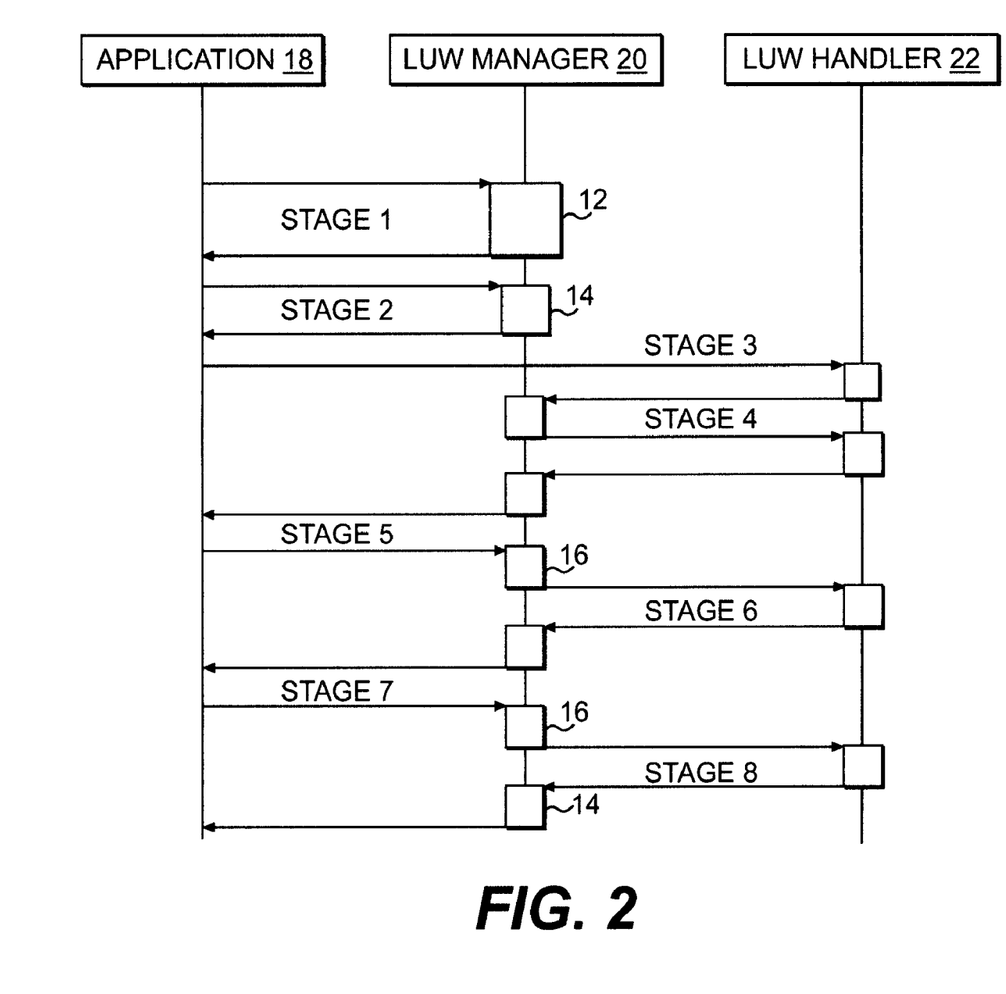
FIG. 2 illustrates the operation of a system consistent with the principles of the present invention.

FIGS. 1 and 2 illustrate the operation of an exemplary nested LUW 10 in a system consistent with the principles of the present invention. FIG. 1 depicts a state diagram of application 11 opening an outer LUW 12, an inner LUW 14 and an innermost LUW 16. At stage 1, application 11 opens outer LUW 12. In stage 2, outer LUW 12 is shown rolling back to the initial state of application 11, meaning the changes performed in outer LUW 12 are not accepted. In stage 3, application 11 is pictured opening inner LUW 14. Because the system may be operative to manage nested LUWs, application 11 need not close outer LUW 12 prior to opening inner LUW 14. Changes performed in inner LUW 14 may be rolled back (stage 4) or committed (stage 5). In either case, LUW 14 is closed, returning the nesting level to level 1, in which application 11 may perform operations in outer LUW 12. While inner LUW 14 is open, application 11 may also open innermost LUW 16 (stage 6). Operations performed in innermost LUW 16 may be either rolled back (stage 7) or committed (stage 8). After both inner LUW 14 and innermost LUW 16 are closed, outer LUW 12 may also be committed by application 11 to accept the changes performed in nested LUW 10 (stage 9). Of course, after inner LUW 14 and innermost LUW 16 are closed, outer LUW 12 may be rolled back to discard all changes caused by nested LUW 10, returning application 11 to its initial state existing prior to opening nested LUW 10.

Referring now to FIG. 2, operations by an application 18, LUW manager 20 and LUW handler 22 on LUW 10 are illustrated. In the example depicted in FIG. 2, inner LUW 14 and innermost LUW 16 may each comprise a set of sub-operations that desirably execute or fail as a group. Therefore, inner LUW 14 and innermost LUW 16 may both be treated as inner LUWs nested within outer LUW 12. As shown at stage 1, application 18 may call LUW manager 20 to open outer LUW 12. Application 18 may also command LUW manager 20 to open inner LUW 14 (stage 2). If the application performs no state-changing operations in LUW 12 or inner LUW 14, there is no need to store the application state existing prior to the operations of LUW 12 or an inner LUW 14 in transient memory. Even if state-changing operations are not performed, however, LUW manager 20 may be operative to track the level of nested LUWs requested by application 18.

Once application 18 desires to perform state-changing operations, it may create an application buffer (stage 3). Application buffer may implement an LUW handling interface, thereby allowing it to function as an LUW handler 22 to carry out rollback, commit or flush commands. Because application 18 may be operative to issue commands regarding open LUWs to LUW manager 20, LUW handler 22 may be operative to register with LUW manager 20 in order to receive notice of LUW events (stage 4).

As shown in stage 5, application 18 may request that LUW manager 20 open innermost LUW 16. Because LUW handler 22 has registered with LUW manager 20, LUW manager 20 is operative to notify LUW handler 22 of the "Open LUW" command, which may prompt LUW handler 22 to store the current state of application 18 in transient memory (stage 6). As shown in stage 7, application 18 may issue a command to LUW manager 20 to rollback the state of application 18 to the state existing prior to the performance of the sub-operations of innermost LUW 16. LUW manager 20 may be operative to dispatch the rollback command to LUW handler 22 (stage 8), which may be operative to carry out the rollback request. Once innermost LUW 16 is closed, the nesting level may return to level 2. LUW manager 20 may be operative to track the current LUW nesting level.

Figure 3:
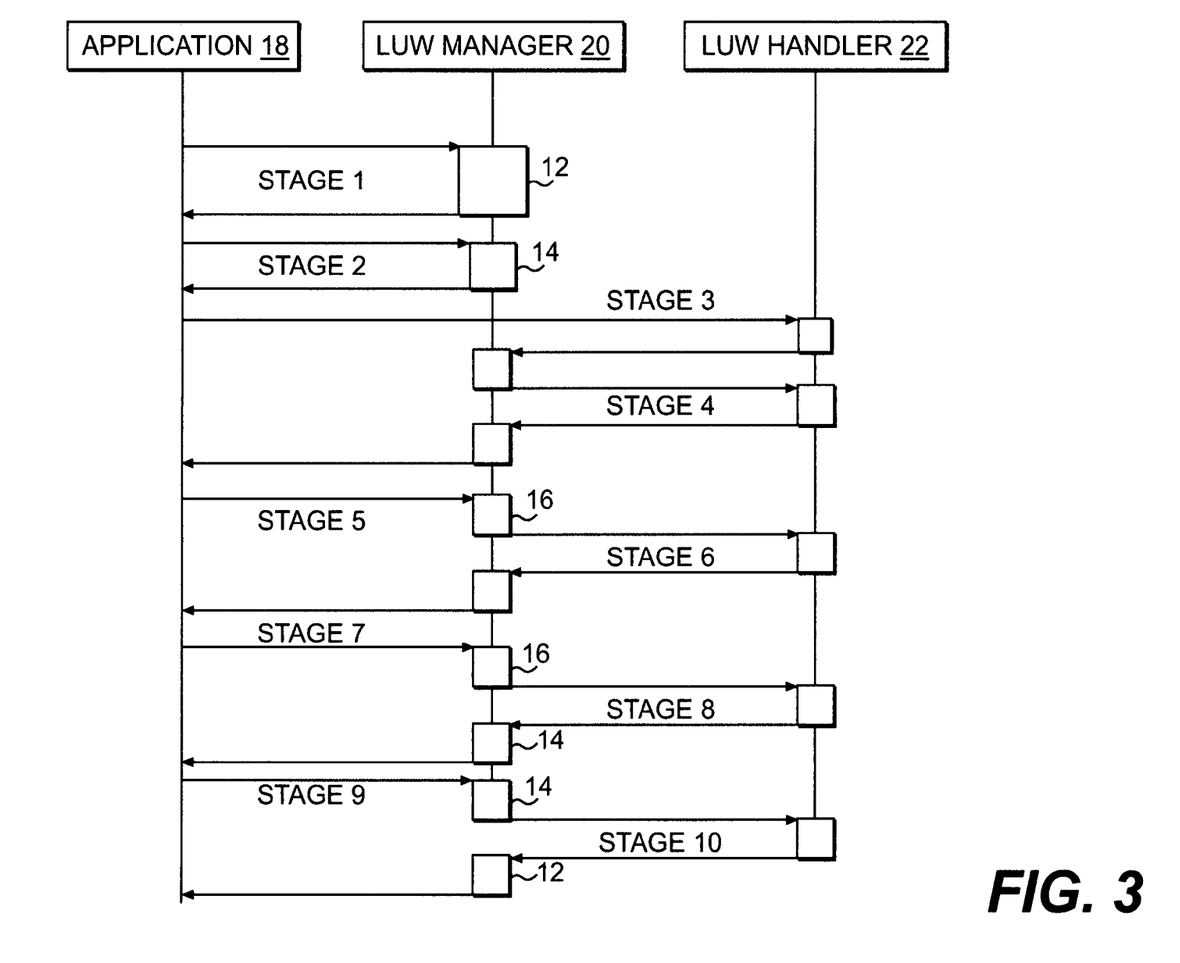
FIG. 3 illustrates the operation of a system for managing a nested LUW consistent with the principles of the present invention.

FIG. 3 is comparable to FIG. 2 until reaching stage 7. In stage 7 of FIG. 3, application 28 prompts LUW manager 20 to close innermost LUW 16. LUW manager 20 may be operative to dispatch the request to LUW handler 22 (stage 8), which may be operative to carry out the close command. By issuing the commit command, application 18 effectively accepts the application state resulting from the sub-operations of innermost LUW 16. In response to the commit command, LUW handler 22 may be operative to discard the application state existing prior to execution of the sub-operations comprising innermost LUW 16, meaning that application 18 may no longer be rolled back to that state. Closing innermost LUW 16 returns the nesting level to level 2. As shown at stage 9, application 28 may prompt LUW manager 20 to close inner LUW 14. LUW manager 20 may be operative to dispatch the request to LUW handler 22 (stage 10), returning the nesting level to level one and allowing application 18 to conduct operations in outer LUW 12.

Application 18 may also issue a command to LUW manager 20 directing that the current buffer state be made persistent on a database (not pictured). LUW manager 20 may dispatch this request to LUW handler 22. In one aspect, LUW handler 22 may not carry out the flush command unless all LUWs are closed. In one aspect, issuing a flush command when an LUW is open may result in a dump. Alternatively, the system could be operative to automatically close or rollback all open LUWs if a flush command is issued with LUWs remaining open.

Various state-holding entities may be interested in the status of an LUW and/or state changes occurring as a result of LUW operations. For example, a locking mechanism may need to know the status of an LUW so that it may determine when a lock on an interested object may be released. Another example is an object that is affected by state changes occurring as a result of LUW operations. Consistent with the principles of the present invention, such interested entities may implement the LUW handling interface and register with the LUW manager to receive notice of events pertaining to an LUW. For example, a buffer containing an object instance interested in state changes resulting from an LUW may register with the LUW manager to receive notice of LUW events. By implementing the LUW handling interface, the interested buffer may rollback or commit state changes in accordance with the object of its interest, ensuring consistency between related objects. Similarly, a locking mechanism that has placed a lock on an object affected by LUW operations may rollback or transfer the lock in accordance with the corresponding LUW events.

As discussed above, an LUW handler may register with the LUW manager after the nesting of LUWs has already begun. As previously discussed, an application may open multiple LUWs before reaching an inner LUW in which it desires to perform state-changing operations, meaning that an LUW handler need not store the application state existing prior to the opening of the first level of nesting. Instead, the LUW handler stores the application state existing when the application first opens an LUW after the LUW handler registers with the LUW manager. As a result, the application may order the LUW manager to rollback to a state existing prior to registration of the LUW handler. The LUW handler may be operative to recognize a command to roll back to a state existing prior to its existence as a command to restore its initial state.

In certain aspects consistent with the principles of the present invention, a locking mechanism may be provided in order to ensure consistency of object views provided to multiple applications or users. The locking mechanism may be operative to implement placement of a lock on an object maintained by an application in transient memory. The locking mechanism may further be operative to manage locks issued on objects maintained in transient memory and affected by performance of nested LUWs, such that the status of a lock remains consistent with the status of the nested LUWs.

As described above, a system capable of managing nested LUWs may comprise an application buffer implementing an LUW handling interface that renders the application buffer operative to carry out commands to rollback or commit LUW operations at the request of the application controlling the LUW. Similarly, consistent with the principles of the present invention, the locking mechanism may implement the LUW handling interface to allow it to rollback a lock when the LUW affecting the locked object is rolled back or to transfer a lock to the outer LUW of a nested LUW when the inner LUW is committed. In this manner, the locking mechanism may maintain the state of a lock consistently with the status of the nested LUW pertaining to the locked object.

Figure 4:
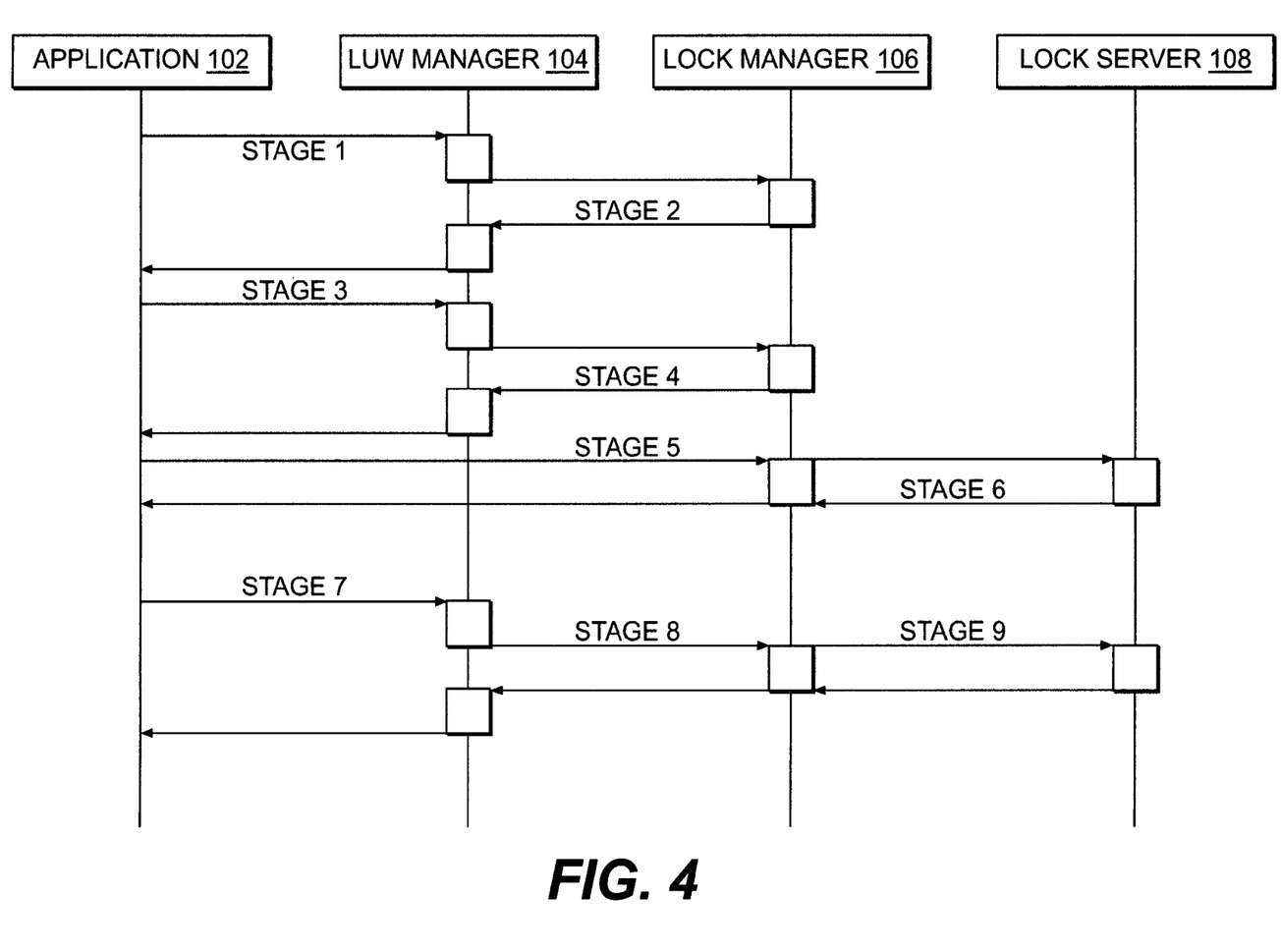
FIG. 4. illustrates the operation of a system operative to manage locks in a nested LUW consistent with the principles of the present invention.

FIG. 4 illustrates the operation of a locking mechanism consistent with the principles of the present invention in a system capable of propagating locks through nested LUWs performed in transient memory. The system may comprise an application 102. Application 102 may request that an LUW manager 104 open an LUW (stage 1). LUW manager 104 may be operative to open the requested LUW. The LUW operations may have state-changing effects on one or more objects maintained by application 102 in transient memory. In order to prevent other applications from changing the state of objects maintained by the application in transient memory pending the result of operations performed in the LUW, application 102 may request that a database lock be placed on such objects.

The system may include a lock manager 106 operative to manage requests from application 102 to place locks on objects. Application 102 may want to lock an object, for example, which may incur a state change as a result of operations performed by application 102 in an open LUW. Lock manager 106 may register with LUW manager 104 to receive notice of events relating to open LUWs that may affect object locks managed by lock manager 106. As shown at stage 2, LUW manager 104 may notify lock manager 106 of the opening of the LUW at the request of application 102. At stage 3, application 102 may prompt LUW manager 104 to open another LUW, creating a nested LUW wherein the first-requested LUW comprises the outer LUW and the second-requested LUW comprises the inner LUW. At stage 4, LUW manager 104 may notify lock manager 106 of the creation of the inner LUW.

When application 102 desires to perform LUW operations that may change the state of an object maintained by application 102 in transient memory, application 102 may issue a request to lock manager 106 that a database lock be placed on an object affected by the LUW operations performed by application 102 and maintained by application 102 in transient memory (stage 5). The database lock serves to prevent other applications from altering the persistent state of the object while application 102 maintains the object in transient memory. Upon receiving the lock request from application 102, lock manager 106 may dispatch the lock request to a lock server 108, which may lock the interested object (stage 6).

As described above in regard to the operation of an exemplary LUW manager, application 102 may issue a command to LUW manager 104 to roll back state changes caused by the operations of the inner LUW (stage 7). LUW manager 104 may issue an event to lock manager 106 notifying it of the rollback command (stage 8). On receiving notice of the rollback event, lock manager 106 may issue an unlock request to lock server 108, which may release the database lock on the interested object (stage 9). Once the lock is released, other applications may access the object and alter its state. If application 102 desires to perform operations of the inner LUW again, it may issue another lock request to lock server 108 via lock manager 106. If the object has not been locked by another application in the meantime, lock server 108 will re-lock the interested object.

Figure 5:
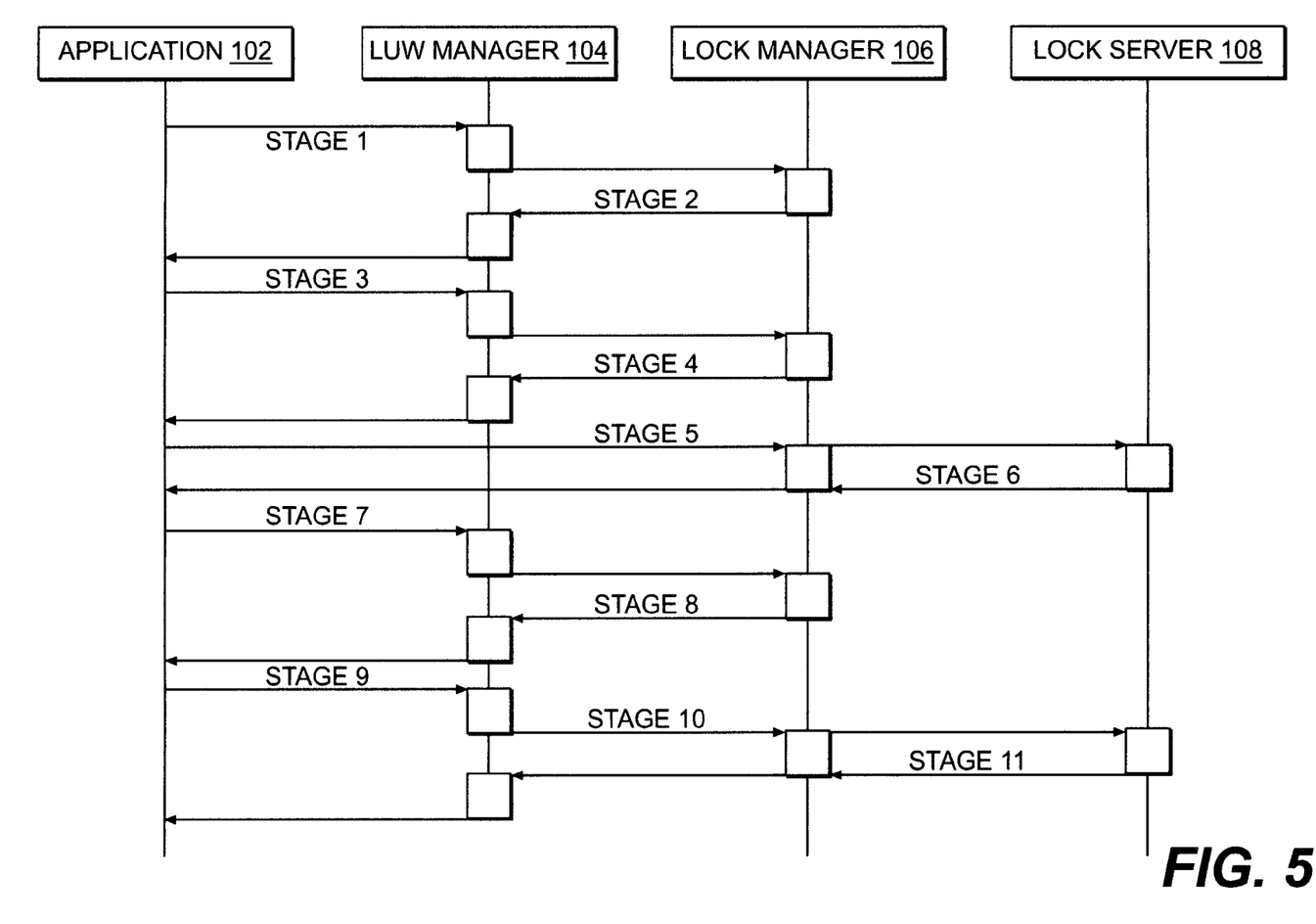
FIG. 5 illustrates the operation of a system operative to manage locks in a nested LUW consistent with the principles of the present invention.

FIG. 5 is comparable to FIG. 4 through stage 7. At stage 7 of FIG. 4, however, application 102 issues a commit command rather than a rollback command, and notification of the command may be relayed to lock manager 106 (stage 8). As illustrated in FIG. 5, issuing a command to commit the changes caused by the operations performed in inner LUW may not prompt lock manager 106 to release the lock on the interested object. Instead, the lock may be maintained, and lock manager 106 may begin evaluating the proper status of the lock based on the status of the outer LUW. At stage 9, application 102 may issue a rollback command for the outer LUW. In response, LUW manager 104 may issue an event to lock manager 106 informing it of the rollback command (stage 10). Lock manager 106 may then be operative to issue an unlock request to lock server 108 (stage 11), which may release the database lock.

Consistent with the principles of the present invention, locks on interested objects may also be released in other manners. For example, application 102 may prompt lock manager 106 to issue an unlock request for the object at any point. Further, if application 102 terminates, causing the buffered application state to terminate, lock manager 106 may release the lock on the object, as the LUW affecting the lock is terminated along with the buffered application state.

Figure 6:
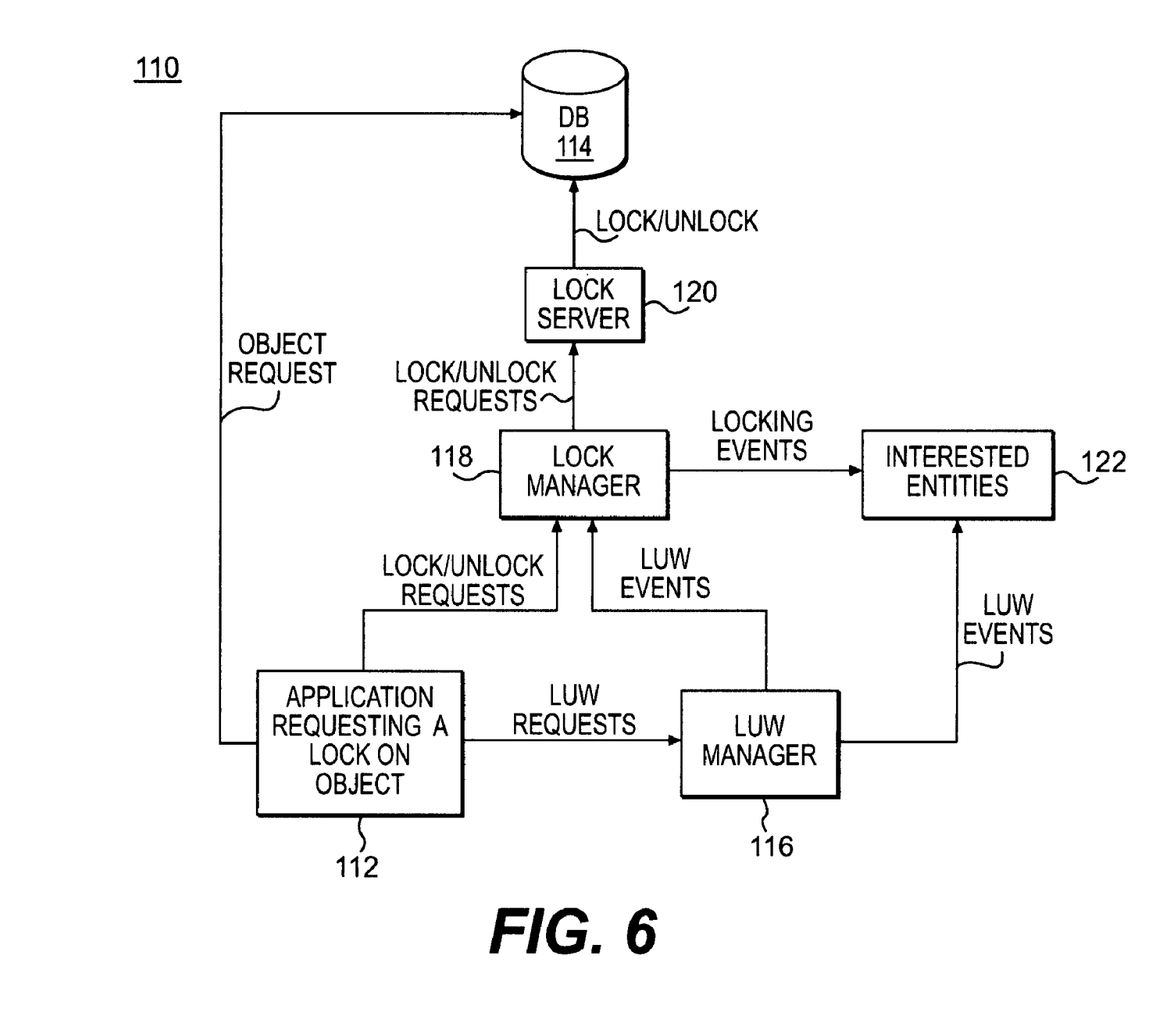
FIG. 6 is a flow diagram illustrating the operation of a system operative to manage locks in a nested LUW consistent with the principles of the present invention.

FIG. 6 illustrates the operation of a system 110 consistent with the principles of the present invention. System 110 may comprise an application 112 operative to open objects from a database 114 and maintain them in transient memory. Application 112 may also open LUWs via an LUW manager 116. LUWs opened by application 112 may affect objects opened by application 112 and maintained in transient memory. Application 112 may issue requests to lock or unlock such objects to a lock manager 118. Lock manager 118 may dispatch lock/unlock requests to a lock server 120 operative to lock/unlock the object stored on database 114. Lock manager 118 may receive events pertaining to the LUW affecting the locked object from LUW manager 116. Lock manager 118 may determine whether the status of a lock should be changed depending on LUW events received from LUW manager 116. In order to allow lock manager 118 to rollback and transfer locks in accordance with the LUW events issued by LUW manager 116, lock manager 118 may implement an LUW handling interface, as described above in regard to the management of nested LUWs.

LUW manager 116 may also transmit LUW events to other state-holding entities 122 interested in the object affected by the LUW operations. Lock manager 118 may also transmit locking events pertaining to the locked object to interested entities 122. Because interested entities 122 receive LUW events from LUW manager 116, and will therefore know when a lock is released due to a rollback command issued by application 112, lock manager 118 need not issue unlock events in response to rollback requests.

In one aspect, a locking mechanism consistent with the principles of the present invention may be operative to support exclusive locks. Only one application may exclusively lock an object at a time, allowing that application to perform state-changing operations. In another aspect, the locking mechanism may be operative to support shared locks, allowing the locking application to read the object, but not permitting the requesting application or any other application, to change the object's state while the shared lock is in place. More than one shared lock may be placed on an object at a time, but no application will be able to exclusively lock the object until all shared locks are removed.

Commonly, objects in a database are associated with one or more dependent collections, which may store attributes of the object. Consistent with the principles of the present invention, a locking mechanism may be operative to implicitly lock all collections depending from an object that is explicitly locked by an application. The locking mechanism may further allow a specific collection to be locked without locking the object from which the collection depends and without locking the other collections depending from that object. When a lock on a root object is released, implicitly locked collections depending from the root object may be released as well. However, in certain aspects, the locking mechanism may issue an unlock event for the object only. In such an aspect, entities interested in the collection must listen for unlock events for the root object or query the locking mechanism for the status of the lock on the collection.

In another aspect, the locking mechanism may be operative to prevent deletion of the root object of a collection while that collection is being maintained. In one version, the locking mechanism may place a shared lock on the object that prevents any application from editing the object while the dependent collection is maintained. In another version, the dependent collection may be mirrored and exclusively locked.

As discussed above in regard to FIG. 6, in certain instances, multiple entities may be interested in the status of a lock placed on an object by the lock manager. Such entities may register with the lock manager to receive notice of lock/unlock events pertaining to a particular object. Such entities may also register with the LUW manager to receive notice of LUW events that may affect the state of objects in which the state-holding entities are interested. Because the interested entities may receive notice of LUW events from the LUW manager, and will thus know whether the a lock on a certain object will be released as a result of the LUW operation, it may not be necessary for the lock manager to dispatch notice of locking events to the interested entities. Therefore, in one aspect consistent with the principles of the present invention, the lock manager need not dispatch an unlock event to interested entities when a lock is released due to a rollback command issued by the locking application.

However, it is possible that an interested entity may register with the lock manager after the object has already been locked. Accordingly, in one aspect, the lock manager may comprise an event repeater. The event repeater may record lock/unlock events issued by the lock manager. An interested entity, such as an application desiring to place a lock on an object, may query the repeater for all previously occurring locking events. If the repeater indicates that the object of interest is not locked, the application may request that the locking mechanism issue a lock. If the repeater indicates that the object is locked, the application may wait until the lock manager issues an unlock event for the object before requesting the lock. In one aspect, the lock manager may implement the event repeater.

Alternatively, in another aspect consistent with the principles of the present invention, it may be possible for an entity interested in the locking status of an object to register with the lock manager and query for locks already in place to determine whether the object in which the object is interested is already locked. In one aspect, the entity may be permitted to query the lock manager only for locks on objects pertaining to the object the entity desires to lock, as opposed to receiving notice of all locks currently managed by the lock manager.

In one aspect consistent with the principles of the present invention, the lock manager may be operative to issue lock requests on multiple objects or collections in response to a request from an application. In one version, the operation may fail if a single one of the objects or collections is not successfully locked, such that either all objects or collections are locked or none are locked. Likewise, the lock manager may be operative to unlock multiple objects or collections in response to appropriate triggering events. In one version, the operation may fail if a single one of the objects or collections is not unlocked.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for managing locks through nested logical units of work (LUW), comprising:

registering a lock manager to receive notice of events from an LUW manager responsible for managing a nested LUW in a first buffer, the nested LUW comprising an inner LUW and an outer LUW;

locking an object affected by the inner LUW of the nested LUW with a lock;

transmitting from the LUW manager to the lock manager notice of an event pertaining to the inner LUW, wherein the notice of the event comprises one of: notice of a rollback event, notice of a commit event, and notice of a flush event;

determining by the lock manager and based on the notice of event pertaining to the inner LUW, whether the lock should be retained or released;

based on the determination, either releasing the lock or retaining the lock; and registering another entity interested in a locking state of the object with the LUW manager to receive the notice of events from the LUW manager and registering the interested entity with the lock manager to receive notification of one of a locking event and an unlocking event pertaining to the object from the lock manager, so that the interested entity receives the notice of events from the LUW manager which indicate application state changes caused by LUW operations and so that the interested entity does not receive a notification of the unlocking event from the lock manager when the notice of the events received from the LUW manager is a notice of a rollback event, and the interested entity instead determines the locking state of the object by using the notice of the rollback event received by the LUW manager.

2. The method of claim 1, further comprising releasing the lock on the object affected by the inner LUW the notice of the event comprises a notice of a rollback event.

3. The method of claim 1, further comprising transferring the lock on the object affected by the inner LUW to the outer LUW if the notice of the event comprises a notice of a commit event.

4. The method of claim 1, wherein locking the object locks all dependent collections of the object and further wherein releasing the lock on the object releases the lock on the dependent collections.

5. The method of claim 1, wherein the locked object may be a collection, wherein further locking the collection does not lock the object the collection depends from.

6. The method of claim 1, wherein locking the object locks all dependent collections of the object and releasing the lock on the object releases the locks on the dependent collections, and further wherein an entity interested in the locking state of a collection locked due to the lock on the object from which the collection depends receives the notice of events relating to the object.

7. The method of claim 1, wherein the interested entity is configured to query the lock manager regarding the current locking state of the object.

8. The method of claim 1, wherein the interested entity is configured to register with a repeater that is operative to inform a second buffer of previously occurring events so the second buffer may determine the locking state of the object.

9. The method of claim 1, wherein, in response to the determining, the lock manager requests to unlock the object by dispatching an unlock request to a lock server operative to carry out the request.

10. A computer-readable memory storage medium which stores a set of instructions which when executed performs a method for managing locks through nested LUWs, the set of instructions implementing a method comprising:
(i) opening, by an LUW manager, a nested LUW in a buffer, the nested LUW comprising an inner LUW and an outer LUW;
(ii) registering a lock manager to receive notice of events from the LUW manager;
(iii) placing a lock on an object affected by the inner LUW in response to a lock request from the lock manager;
(iv) transmitting notice of an event pertaining to the nested LUW from the LUW manager to the lock manager, wherein the notice of the event comprises one of: a notice of a rollback event, a notice of a commit event, and a notice of a flush event;
(v) determining by the lock manager and based on the notice of the event, whether to release the lock;
(vii) based on the determining, either prompting release of the lock or retention of the lock; and
(viii) registering another entity interested in a locking state of the object with the LUW manager to receive the notice of events from the LUW manager and registering the interested entity with the lock manager to receive notification of one of a locking event and an unlocking event pertaining to the object from the lock manager, so that the interested entity receives the notice of events from the LUW manager which indicate application state changes caused by LUW operations and so that the interested entity does not receive a notification of the unlocking event from the lock manager when the notice of the events received from the LUW manager is a notice of a rollback event, and the interested entity instead determines the locking state of the object by using the notice of the rollback event received by the LUW manager.

11. The computer-readable memory storage medium of claim 10, wherein step (vii) further comprises prompting release of the lock on the object affected by the inner LUW if the notice of the event comprises a notice of a rollback event.

12. The computer-readable memory storage medium of claim 10, wherein step (vii) further comprises prompting transfer of the lock to the outer LUW if the notice of the event comprises notice of a commit event.

13. The computer-readable memory storage medium of claim 10, wherein the method further comprises prompting locking of a collection depending from the locked object.

14. The computer-readable memory storage medium of claim 10, wherein step (vii) further comprises prompting a lock server to carry out a request from the lock manager to lock or unlock an object.

* * * * *